United States Patent [19]

Maeda et al.

[11] Patent Number: 5,099,271
[45] Date of Patent: Mar. 24, 1992

[54] IMAGING MATERIAL PROVIDING DEVICE

[75] Inventors: Masataka Maeda, Konan; Yasuhiro Hattori, Nagoya, both of Japan

[73] Assignee: Brother Kogyo Kabushiki Kaisha, Aichi, Japan

[21] Appl. No.: 642,845

[22] Filed: Jan. 18, 1991

[30] Foreign Application Priority Data

Jan. 19, 1990 [JP] Japan .................................. 2-10906
Jan. 23, 1990 [JP] Japan ................................ 2-5274[U]

[51] Int. Cl.⁵ ............................................ G03B 27/52
[52] U.S. Cl. .................................... 355/27; 118/624; 118/625; 118/644; 118/656
[58] Field of Search ................................ 355/27-29, 355/100, 106, 274-276; 430/138; 118/620, 621, 626, 636, 638, 645, 651, 654, 658, 644, 656, 648, 624, 625; 250/324-326; 361/213, 214, 229, 230

[56] References Cited

U.S. PATENT DOCUMENTS

| 4,444,864 | 4/1984 | Takahashi | 118/657 X |
| 4,774,541 | 9/1988 | Martin et al. | 355/274 |
| 4,940,643 | 7/1990 | Sakai et al. | 430/108 |
| 4,943,509 | 7/1990 | Sakai et al. | 430/138 |

FOREIGN PATENT DOCUMENTS 58-44457 3/1983 Japan .
58-114974 7/1983 Japan .
62-248662 10/1987 Japan .

Primary Examiner—L. T. Hix
Assistant Examiner—D. Rutledge
Attorney, Agent, or Firm—Oliff & Berridge

[57] ABSTRACT

An imaging material providing device of the present invention comprises: means for carrying imaging material particles charged to a first polarity, the imaging material carrying means having a portion formed of elastic material for holding the imaging material particles; means for receiving imaging material particles, the imaging material carrying means being disposed apart from the imaging material carrying means with a gap therebetween and being charged to a second polarity opposite to the first polarity so that the imaging material particles may be electrostatically attached onto the imaging material receiving means; means for elastically deforming the elastic portion of the carrying means, the imaging material particles being introduced into the gap when the deformed elastic portion is restored; and means for generating an electric field in the gap and electrostatically attracting the charged imaging material particles in a direction toward the imaging material receiving means.

9 Claims, 5 Drawing Sheets

IMAGING MATERIAL PROVIDING DEVICE

BACKGROUND OF THE INVENTION

1. Field of the Invention

The present invention relates to an image recording apparatus such as a copying machine, a printer device and a plotter device, and more particularly to a device for providing imaging material particles such as toner particles on a support member. The term "imaging material particles" as used herein includes toner particles, developer material particles, etc. for forming a visible image.

2. Description of the Related Art

Various kinds of image recording apparatuses are provided with devices for providing imaging material particles on support members. There has been conventionally known the imaging material providing device of the type in which charged imaging material particles are carried on a carry member, a support member is mounted on a mount member such that the support member may confront the carry member with a gap therebetween, and an electric field is produced in the gap so that the charged imaging material particles are electrostatically attracted toward the support member with the electric field to thereby be attached onto the support member.

As one example of the imaging material providing device, there has been proposed an image recording device provided with a plurality of control electrodes each having an aperture. The control electrodes are placed between a toner carry member and a support member mount member. The carry member carries thereon charged imaging material particles such as toner particles. Image signals are applied to the control electrodes to selectively charge the electrodes to a second polarity opposite to the polarity of the toner particles to thereby produce electric fields between the carry member and the control electrodes. The toner particles carried on the carry member are electrostatically attracted to the control electrodes with the electric fields, and pass through the apertures on the control electrodes to reach the support member on the mount member. The toner particles attached to the support member form a visible toner image corresponding to the image signals.

In the above-described image recording device, it is necessary to convey the toner particles to portions near to the apertures of the control electrodes where electric fields are produced. There have been conventionally proposed various types of manners how the toner particles are conveyed to the portions near to the apertures.

For example, a Japanese Patent Unexamined Application Publication No. 62-248662 proposes that the toner carry member comprises a roller-shaped member on the surface of which the charged toner particles are carried, and the roller-shaped carry member is rotated to convey the toner particles to the portions near to the apertures. In this case, however, adhesion force of the toner particles to the surface of the roller is relatively large, and therefore high voltage is required to be applied to the control electrodes to attract the toner particles. As a result, it is necessary to mount a high voltage power supply in the image recording device.

A Japanese Unexamined Patent Application Publication No. 58-44457 proposes another type of manner of conveying the toner particles to the portions near to the apertures that an alternate electric field is produced between the toner carry member and the control electrodes so that the toner particles may be changed into mist form to be conveyed to the portions near to the apertures. In this case, however, the applied alternate voltage disturbs the electric fields generated by the image signals, as a result of which it becomes impossible to obtain a clear image. Furthermore, such a device is made expensive, since it is necessary to mount an AC high voltage power supply in the device.

A Japanese Unexamined Patent Application Publication No. 58-114974 proposes that a flow of air conveys the toner particles to the portions near to the apertures. In this case, however, it becomes necessary to provide the image recording device with a unit for generating the air flow such as an air compressor unit, as a result of which the device as a whole becomes complicated and expensive.

Another example of the device for electrostatically providing the imaging material particles to the support member is utilized as a unit for producing a developer sheet from a support member which is a plain paper selected arbitrarily by an user. The developer sheet producing unit is mounted in an image forming apparatus such as a color copying machine. In this type of image forming apparatus, a microcapsule sheet is exposed to light to form a latent image thereon, and is superposed on the developer sheet which has been previously produced in the developer sheet forming unit. The superposed sheets are subjected to pressure development action to form a visible toner image on the developer sheet which is then thermally fixed in a heat fixing unit.

In the imaging material providing device applied as the developer sheet producing unit, the support member is mounted on a mount member, charged imaging material particles (such as charged developer material particles) are carried on a carry member, and an electric field is produced in a gap between the support member mount member and the charged developer material carry member. The charged developer material particles carried on the carry member are electrostatically attracted to the support member with the electric field. The support member is conveyed by the mount member, and the entire surface of the support member is coated with the developer material particles to produce a developer sheet.

In the imaging material providing device as constructed above, the carry member conveys the charged imaging material particles to the region where the electric field occurs. As the imaging material carry member, one of the co-inventors of the present invention proposes, in the copending U.S. patent application Ser. No. 07/498,761 filed on Mar. 26, 1990 (not prior art), such a carry member as comprising a brush-shaped roller with its peripheral surface having a number of ciliary members implanted thereon. According to the carry member of the type, the developer material particles can be filled in gaps between neighboring ciliary members, so that a lot of developer material particles can be conveyed toward the region where the electric field occurs.

Such a imaging material providing device using a brush roller, however, has a problem that the developer material particles jam in gaps between neighboring ciliary members of the brush roller in the case where the device is operated for a long time. As a result, the amount of the developer material particles conveyed by the electric field to be attached onto the support member is decreased, so that it is impossible to produce a developer sheet coated with sufficient amount of developer material particles.

SUMMARY OF THE INVENTION

The present invention is achieved to solve the above-described problems. An object of the present invention is, therefore, to provide a imaging material providing device which has a simple structure with no additional unit but able to certainly provide a sufficient amount of the imaging material particles to the support member. More specifically, the object of the invention is to certainly provide, with a simple structure, a sufficient amount of the charged imaging material particles to the region where the electric field occurs.

In order to achieve the above object, a imaging material providing device of the present invention comprises: means for carrying imaging material particles charged to a first polarity, the imaging material carrying means having a portion formed of elastic material for holding the imaging material particles; means for receiving the imaging material particles, the imaging material receiving means being disposed apart from the imaging material carrying means with a gap therebetween and being charged to a second polarity opposite to the first polarity so that the imaging material particles may be electrostatically attached onto the imaging material receiving means; means for elastically deforming the elastic portion of the carrying means, the imaging material particles being introduced into the gap when the deformed elastic portion is restored; and means for generating an electric field in the gap and electrostatically attracting the charged imaging material particles in a direction toward the imaging material receiving means.

The imaging material providing device of the present invention is utilized as an image forming apparatus and a developer sheet producing device, and is further applicable to an ordinary electrophotographic machine such as a copying machine, a laser beam printer device, etc.

According to the imaging material providing device of the invention having such a simple structure as described above, it becomes possible to certainly provide a sufficient amount of imaging material particles to the region where the electric field occurs. It becomes possible to prevent the imaging material particles from jamming in the carry means. Therefore, it becomes possible to certainly provide a sufficient amount of imaging material particles to the support member for a long time, with a simple structure without an additional unit such as an alternate high voltage power supply or an air compressor. Therefore, it becomes possible to produce the device at low cost.

According to another aspect of the present invention, an image forming apparatus for forming an image of an original document comprises: means for exposing a microcapsule sheet to an imaging light bearing the image of the original document to form a latent image thereon corresponding to the image of the original document, the microcapsule sheet having a surface coated with an immense number of pressure rupturable microcapsules, each microcapsule encapsulating therein dye precursor; means for producing a developer sheet by providing imaging material particles to a support member; means for developing the latent image by applying a pressure to the exposed microcapsule sheet and the developer sheet superposed one on the other to form a visible image on the developer sheet upon reaction of the dye precursor released from the ruptured microcapsules with the imaging material particles; and means for thermally fixing the visible image on the developer sheet; wherein the developer sheet producing means comprises means for carrying imaging material particles charged to a first polarity, the imaging material carrying means having a portion formed of elastic material for holding the imaging material particles; means for conveying the support member, the conveying means being disposed apart from the imaging material carrying means with a gap therebetween and being charged to a second polarity opposite to the first polarity so that the imaging material particles may be electrostatically attached onto the support member; means for elastically deforming the elastic portion of the carrying means, the imaging material particles being introduced into the gap when the deformed elastic portion is restored; and means for generating an electric field in the gap and electrostatically attracting the charged imaging material particles in a direction toward the support member.

DETAILED DESCRIPTION OF THE PREFERRED EMBODIMENT

The preferred embodiments of the present invention will be described in detail below.

A first embodiment of the present invention is obtained by applying the present invention to an image recording apparatus having electrodes with apertures, to which image signals are applied to selectively allow imaging material particles such as toner particles to pass through the apertures to reach the support member so that a visible image corresponding to the image signals may be formed on the support member.

The image recording apparatus according to the first embodiment comprises: means for carrying imaging material particles charged to a first polarity, the imaging material carrying means having a portion formed of elastic material for holding the imaging material particles; means for conveying a support member, the conveying means being disposed apart from the imaging material carrying means with a gap therebetween and being charged to a second polarity opposite to the first polarity so that the imaging material particles may be electrostatically attached onto the support member; means for elastically deforming the elastic portion of the carrying means, the imaging material particles being introduced into the gap when the deformed elastic portion is restored; and a plurality of control electrodes arranged at a position between the support member conveying means and the imaging material carrying means, each of the control electrodes having an aperture, image signals being applied to the control electrodes to selectively charge the control electrodes to the second polarity so that the charged imaging material particles floating in the gap may be electrostatically attracted toward the control electrodes to pass through the apertures to reach the support member and form a visible image on the support member corresponding to the image signals.

The imaging material carrying means may preferably comprise a brush-shaped roller member having a peripheral surface and an axis rotatable thereabout, a plurality of ciliary members being implanted on the peripheral surface thereof, each of the plurality of ciliary members being formed of elastic material for holding the imaging material particles.

The deforming means may preferably comprise a blade member disposed in contact with the ciliary members, the ciliary members being elastically deformed and then restored as the roller member rotates about the axis.

The first embodiment will be described in more detail below with reference to the accompanying drawings, i.e., FIGS. 1 and 2.

Figure 2:
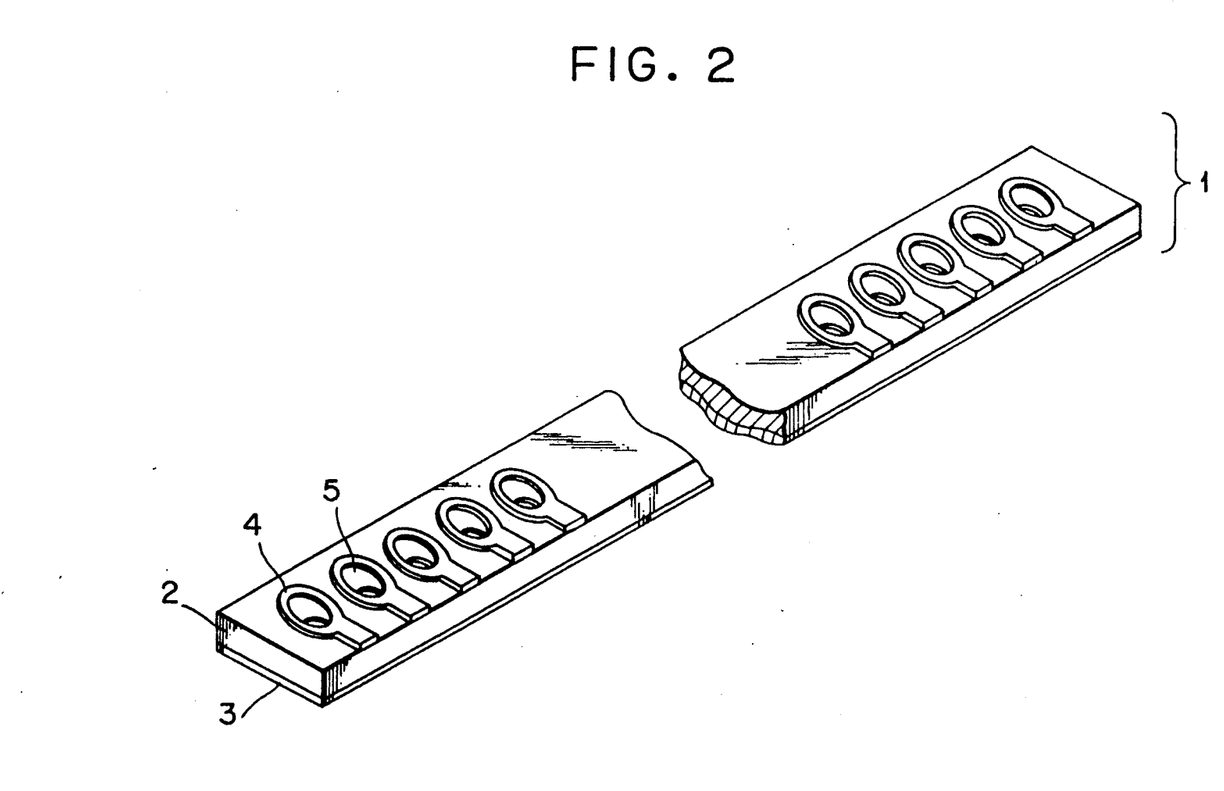
FIG. 2 is a perspective view showing one example of a control member with apertures used in the first embodiment and partly showing the sectional view thereof.

FIG. 2 is a perspective view of a control member 1 with apertures used in the first embodiment of the present invention. FIG. 2 also shows partially the section of the member 1. The control member 1 is formed by providing an insulating layer 2 between a reference electrode 3 and a plurality of segment control electrodes 4. The segment control electrodes 4 are arranged in a line on the insulation layer 2. The segment electrodes 4 correspond to the picture elements of an image to be obtained. An aperture 5 is provided at each segment electrode 4. The apertures 5 are formed by perforating the insulating layer 2 and the electrodes 3 and 4.

Figure 1:
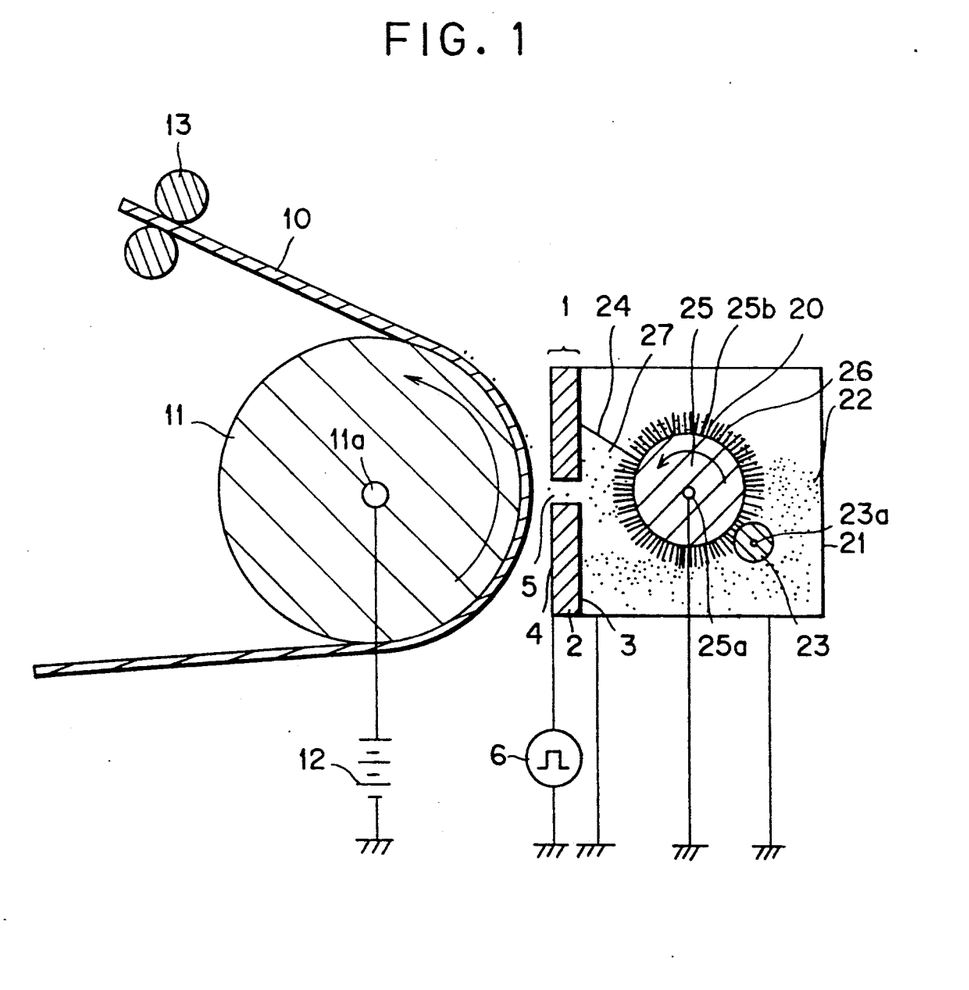
FIG. 1 shows a construction of an image recording apparatus of a first embodiment.

FIG. 1 shows a construction of the image recording apparatus of the first embodiment of the present invention utilizing the above-described control member 1. As shown in FIG. 1, the segment electrodes 4 of the control member 1 confront an electrode roller 11 for conveying a support member 10. The electrode roller 11 is placed such that the segment electrodes 4 are arranged in a line parallel to an axis 11a of the electrode roller 11. The electrode roller 11 is placed at a distance from the control member 1 in a range of about 0.5 mm to about several millimeters. The electrode roller 11 is rotated in a counterclockwise direction to convey the support member 10, as shown in FIG. 1. A fixing unit 13 is placed at a discharge side (or downstream side) of the conveyance path of the support member 10.

The reference electrode 3 of the control member 1 confronts a brush-shaped roller 20. The brush roller 20 is placed such that the segment control electrodes 4 are arranged in a line parallel to an axis 25a of a core 25 of the brush roller 20. Therefore, the segment control electrodes 4 are arranged in a line parallel to both the axis 11a of the roller 11 and the axis 25a of the roller 20, so that the apertures 5 of the segment electrodes 4 and the axes 11a and 25a are placed in a single plane extending in the horizontal direction in FIG. 1. A supply roller 23 is provided with its axis 23a extending parallel to the axis 25a of the brush roller 20. The brush roller 20 and the supply roller 23 are provided in a toner container 21 in which imaging material particles such as toner particles 22 are stored. The control member 1 serves as one face of the toner container 21. The brush roller 20 has a core member 25 having a peripheral surface 25b and has a plurality of ciliary members 26 implanted on the peripheral surface 25b. The ciliary members 26 are contacted with the supply roller 23.

A blade 24 for scratching the ciliary members 26 of the brush roller 20 is provided on the reference electrode 3 of the control member 1, at an upper portion of the apertures 5 in the vertical direction in the FIG. 1. Since the apertures 5 and the axis 25a of the brush roller 20 are placed in the single horizontal plane, the blade 24 is positioned at an upper portion of the axis 25a of the roller 20 in the vertical direction in FIG. 1. Therefore, the blade 24 extending from the reference electrode 3 contacts, with its tip end, an upper side portion of the brush roller 20. Since the brush roller 20 is rotated in a counterclockwise direction as shown in FIG. 1, the ciliary members 26 holding the toner particles are scratched by the blade 24 before confronting the apertures 5 of the member 1.

The tip end of the blade 24 contacts the ciliary members 26, at their approximately central portions. The ciliary members 26 are formed of elastic material such as acrylic resin, polytetrafluoroethylene known as Teflon (Trade Mark), etc. The length of the ciliary members is about 1 mm. The ciliary members 26 are implanted on the peripheral surface 25b of the brush roller 20 uniformly at their implant density of thirty hundreds per a circle with a radius of one inch.

The electrode roller 11 is connected to a direct current power supply 12, and the segment control electrodes 4 are connected to a voltage signal applying circuit 6. The reference electrode 3, the core 25 of the brush roller 20 and the toner container 21 are electrically grounded.

The image forming apparatus of the first embodiment constructed as described above operates as described below.

In accordance with the rotations of the brush roller 20 and the supply roller 23, the brush roller 20 rubs its ciliary members 26 against the toner particles 22, so that the toner particles 22 are triboelectrically charged with friction between the ciliary members 26 and the toner particles 22. The polarity of the triboelectrically charged toner particles is determined by the kind of the toner particles and the material of the ciliary members. In this case, the toner particles are charged negatively, for example. The charged toner particles are then held among the ciliary members 26 due to an electrostatic force. In accordance with the further rotation of the brush roller 20, the toner particles 22 held among the ciliary members 26 are conveyed toward the portion where the tip end of the blade 24 contacts the ciliary members 26. When the blade 24 contacts the ciliary members 26, as the roller 20 is further rotated, the blade 24 elastically deforms the ciliary members 26. Then, the roller 20 is further rotated, and the deformed ciliary members 26 are separated from the blade 24, so that the ciliary members spring back due to their elasticity and restored their original state. At this moment, the charged toner particles 22 held among the ciliary members 26 jump up out of the ciliary members 26 to fly up into a region 27 near to the apertures 5. The toner particles then form a mist of toner particles floating at the region 27.

Image signals are applied to the segment electrodes 4. The image signals corresponding to image portions have a polarity opposite to a polarity of the charged toner particles. Therefore, the segment electrodes 4 to which the image signals corresponding to the image portion are applied (which will be referred to as "segment electrodes 4A") are charged to the polarity opposite to that of the toner particles. In this case, since the toner particles are charged negatively, the segment electrodes 4A are charged positively. As a result, electric fields are generated in the region 27 for electrostatically attracting the charged toner particles in a direction toward the electrodes 4A. Therefore, the toner particles floating in the region 27 are moved along the slope of the electric fields generated by the segment electrodes 4A to pass through the apertures 5 placed at the segment electrodes 4A. The toner particles having passed through the apertures 5 are moved toward the support member 10.

On the other hand, the image signals corresponding to non-image portions have a polarity the same with that of the toner particles or have a value 0 corresponding to the ground voltage. Therefore, the segment electrodes 4 to which the image signals corresponding to the non-image portion are applied (which will be referred to as "segment electrodes 4B") are charged to a polarity the same with that of the toner particles or are grounded. Therefore, the toner particles 22 floating in the region 27 are not moved to the segment electrodes 4B, so that the toner particles do not pass through the apertures 5 placed at the segment electrodes 4B.

As described above, the segment control electrodes 4 selectively allow the toner particles to pass through the apertures 5 to move toward the support member 10, in accordance with the applied image signals.

To the electrode roller 11, there is always applied a voltage with its polarity opposite to the polarity of the charged toner particles. In this case, since the toner particles are charged negatively, the electrode roller 11 is charged positively. Therefore, the toner particles having passed through the apertures 5 to reach the support member 10 are electrostatically attached onto the surface of the support member 10 mounted on the electrode roller 11.

The support member is conveyed by the electrode roller 11 synchronously with the application of the image signals to the segment control electrodes 4. Therefore, the toner particles attached onto the support member 10 form a visible toner image corresponding to the image signals.

The support member 10 on which the toner image is thus formed is conveyed toward the fixing unit 13 where the toner image is thermally fixed on the support member.

According to the present invention, the toner particles jump out of the ciliary members to fly into the air to form a mist floating at the region 27 where the electric fields are generated. There does not occur an adhesion force, such as Van der Waals force, between the thus floating toner particles 22 and the brush roller 20. Therefore, it becomes possible to attract the toner particles toward the support member 10, even if the slope of the generated electric fields is gentler than that of the case where the toner particles are adhered to the roller 20. Therefore, according to the present invention, it is unnecessary to apply a high voltage to the control electrodes 4 in comparison with the case where the toner particles are adhered to the roller 20. Furthermore, since an alternate voltage is not applied, the electric fields generated by the image signals are prevented from being disturbed.

As described above, according to the image forming apparatus of the first embodiment, the charged toner particles are held among the ciliary members 26 of the brush roller 20 due to the electrostatic force and are conveyed to the positions near to the control member 1. Then, in accordance with the rotation of the roller 20, the ciliary members 26 are scratched by the blade 24 to be elastically deformed. In accordance with the further rotation of the roller 20, the deformed ciliary members 26 are separated from the blade 24 and spring back due to their elasticity to restore their original forms, as a result of which the toner particles held among the ciliary members 26 jump out of the ciliary members to fly up into the air and form a floating mist of toner particles. Since voltages corresponding to the image signals are applied to the control electrodes 4, the floating toner particles pass through only the apertures 5 of the electrodes 4A to which the image signals corresponding to the image portions are applied. The toner particles thus having passed through the apertures 5 move to reach the support member 10 to form a visible toner image thereon corresponding to the image signals.

According to the first embodiment of the present invention, therefore, it becomes possible to provide an inexpensive image forming apparatus which has a simple structure with no additional unit such as an alternate high voltage power supply or air compressor but which can accurately control the toner particles passage through the apertures of the control electrode. Furthermore, the electric fields generated by the image signals can be prevented from being disturbed, so that it is possible to obtain a clear image on the support member.

A second embodiment of the present invention will be described below. The second embodiment is obtained, by applying the present invention to an imaging material coating device for producing a developer sheet to be used in an image forming apparatus such as a color copying machine.

An imaging material coating device of the second embodiment comprises: means for carrying imaging material particles charged to a first polarity, the imaging material carrying means including a brush-shaped roller member having a peripheral surface and an axis rotatable thereabout, a plurality of ciliary members being implanted on the peripheral surface thereof, each of the plurality of ciliary members being formed of elastic material for holding the imaging material particles; means for conveying a support member, the conveying means being disposed apart from the imaging material carrying means with a gap therebetween and being charged to a second polarity opposite to the first polarity so that the imaging material particles may be electrostatically attached onto the support member; means for elastically deforming the elastic portion of the carrying means, the imaging material particles being introduced into the gap when the deformed elastic portion is restored, the deforming means including a wire member extending in a direction in parallel to the axis and being disposed in contact with the ciliary members, the ciliary members being elastically deformed and then restored as the roller member rotates about the axis; and means for generating an electric field in the gap and electrostatically attracting the charged imaging material particles in a direction toward the support member, the electric field generating means including means for charging the support member conveying means to the second polarity so that the entire surface of the support member may be coated with the imaging material particles.

The second embodiment will be described in more detail with reference to FIGS. 3 through 5.

Figure 3:
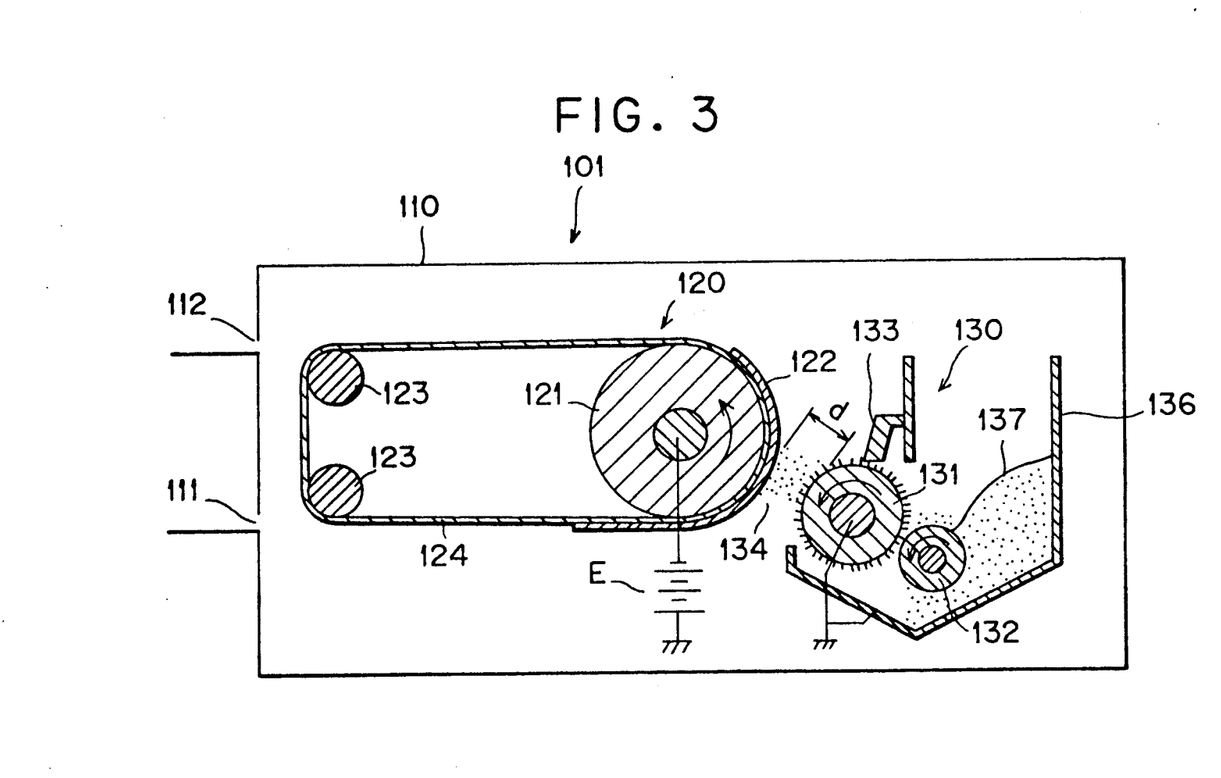
FIG. 3 shows a construction of a imaging material coating device of a second embodiment.

FIG. 3 shows an imaging material coating device 101 of the second embodiment. The imaging material coating device 101 includes a casing 110, a support member conveying unit 120 for conveying a support member 122 such as plain paper to be coated with imaging material particles such as developer material particles, and a developer material supply unit 130 for coating the support member 122 with the developer material particles.

At the left side of the casing 110 of the imaging material coating device 101, there are provided an inlet 111 for receiving the support member 122 in the device 101 and an outlet 112 for discharging the support member out of the device 101.

The support member conveying unit 120 includes an electrode roller 121, a direct current power supply E connected to the electrode roller 121 for applying a predetermined amount of high voltage to the electrode roller 121, and conveyance rollers 123 disposed at predetermined positions. A conveyor belt 124 for conveying thereon the support member 122 is suspended among the electrode roller 121 and the conveyor rollers 123.

The developer material supply unit 130 includes a developer material carry roller 131 with its roller core being electrically grounded, an additionally provided developer material supply roller 132 for carrying thereon developer material particles 137, and a developer material separating member 133 for separating the developer material particles 137 from the carry roller 131 to allow the developer material particles to be electrostatically attracted toward the support member 122 with an electric field. The developer material supply unit 130 further includes a hopper 136 for containing developer material particles 137. The developer material carry roller 131 of the developer material supply unit 130 confronts the electrode roller 121 of the support conveyance unit 120, with a gap d in a range of 0.2 mm to 1 mm being disposed therebetween. There is formed a transferring region 134 in the gap d between the electrode roller 121 and the developer material carry roller 131.

Figure 4:
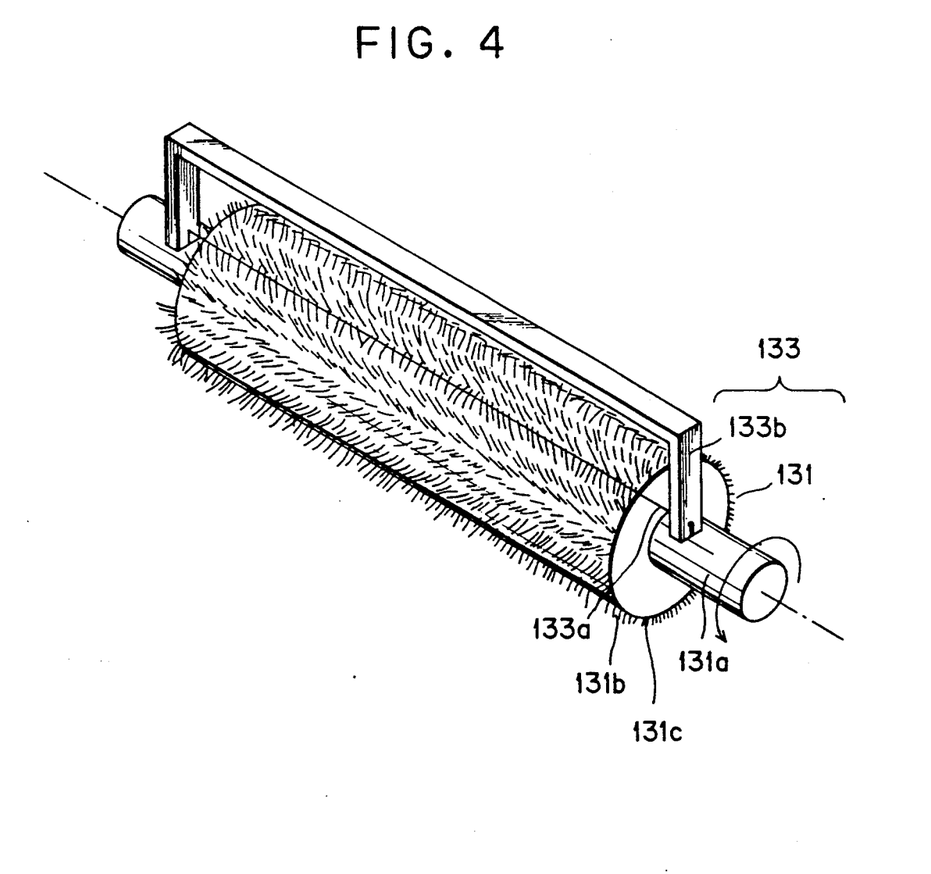
FIG. 4 shows only an essential portion of the device of the second embodiment.

As shown in FIG. 4, the developer material carry roller 131 of the developer material supply unit 130 includes a core member 131a formed of metal such as stainless steel and a peripheral surface 131c on which a plurality of ciliary members 131b are implanted. The ciliary members 131b are formed of material such as acrylic resin, polytetrafluoroethylene known as Teflon (Trade Mark), etc. The length of the ciliary members 131b is about several tenths mm, and the implanting density thereof is about thirty thousands per a circle with a radius of one inch. The developer material separating member 133 includes a wire member 133a for elastically deforming the ciliary members 131b and a frame 133b for supporting the wire member 133a. The wire member 133a is made of an insulator material such as nylon. The developer material separating member 133 is placed in such a manner that the wire member 133a extends in a direction substantially parallel to the axis of the core 131a of the roller 131 and at least tip ends of the ciliary members 131b of the developer material carry roller 131 may be contacted with the wire member 133a of the developing agent separating member 133.

The developer material coating device 101 as constructed above performs as will be described below.

The developer material carry roller 131 and the developer material supply roller 132 are rotated in a counterclockwise direction as indicated by arrows in FIG. 3. The developer material particles stored in the hopper 136 are conveyed to a portion close to the developer material carry member 131 in accordance with the rotation of the developer material supply roller 132. Since the developer material particles 137 are made of dielectric material, the developer material particles are triboelectrically charged through the friction between the developer material particles and the ciliary members 131b. The polarity of the triboelectrically charged developer material particles is determined by the kind of developer material particles and the material of the ciliary members. In this case, the developer material particles are charged positively, for example. Thus charge developer material particles are held uniformly among the ciliary members 131b of the developer material carry roller 131. In accordance with further rotation of the developer material carry roller 131, the tip ends of the ciliary member 131b holding the developer agent particles are contacted with the wire 133a, and the ciliary members 131b are deformed elastically. Then, as the roller 131 is further rotated, the deformed ciliary members 131b are separated from the wire 133a, and the ciliary members 131b swing back and restore their original states due to their elasticity. At this moment, the developer material particles jump up out of the ciliary members 131b to fly up into the transferring region 134. The developer material particles 137 thus separated from the carry member 131 form a mist of developer material particles and float in the transferring region 134.

Due to the swinging movement of the ciliary members 131b, the ciliary members 131b again come into abutment with the wire 133a, as a result of which the wire 133a also starts performing a swinging operation. In accordance with the rotation of the roller 131, the swinging wire 133a comes into abutment with the ciliary members 131b' implanted next to the already scratched ciliary members 131b to let the ciliary members 131b' perform swinging operation. The amplitude and the frequency of the thus obtained swinging operation of the ciliary members 131b' become so large that all the developer material particles filled between the ciliary members may jump out of the ciliary members. Therefore, according to the invention, the force of the wire for scratching the tip ends of the ciliary members becomes large enough to separate all the developer material particles 137 from the ciliary members, so that the developer material particles are prevented from jamming among the ciliary members 131b.

The support member 122 to be coated with the developer material particles 137, is inserted into the device 101 through the inlet 111. The support member 122 is conveyed on the conveyor belt 124 toward the transferring region 134, in accordance with the rotation of the electrode roller 121 and the conveyance rollers 123. The electrode roller 121 is made of metal. A high negative voltage is applied to the electrode roller 121 by the direct current power supply E, and the core 131a of the carry roller 131 is electrically grounded, so that an electric field is formed in the transferring region 134. The polarity of the voltage applied to the electrode roller 121 is opposite to a polarity of the charged developer material particles. In this case, since the developer material particles are charged positively, the electrode roller 121 is charged negatively. Therefore, the developer material particles 137 floating in the mist form in the transferring region 134 are electrostatically attracted toward the electrode roller 121 with the electric field. Since the developer material particles 137 float in the mist manner in the transferring region 134, there is not generated any adhesion force such as Van der Waals force for preventing the developer material particles from flying toward the electrode roller 121. Therefore, according to the present invention, the developer material particles can be certainly allowed to fly toward the electrode roller 120, even if the slope of the produced electric field is gentler than that of the case where the developer material particles are adhered to the carry member. Therefore, according to the present invention, it is unnecessary to apply so high negative voltage to the electrode roller 120, in comparison with the case where the developer material particles are adhered to the carry member.

The support member is conveyed by the conveying unit 120, so that the entire surface of the support member is coated with the developer material particles. The support member 122 thus coated with the developer material particles 137 is further conveyed in accordance with the operation of the support member conveying unit 120, and is discharged out of the casing 110 through the outlet 112.

A color image forming apparatus to which the above-described developer material coating device of the second embodiment is applied will be described below. The above-described developer material coating device 101 is utilized as a developer sheet producing unit for producing a developer sheet from a support member such as a plain paper which is selected arbitrarily by a user.

The color image forming apparatus utilizes a microcapsule sheet (photosensitive and pressure-sensitive sheet). The microcapsule sheet has a surface and a number of microcapsules placed on the surface, the microcapsules encapsulating therein dye precursors. The microcapsules change their mechanical strength upon receiving light. In the color image recording apparatus, the microcapsule sheet is exposed to light having passed through a color separation filter unit and an original sheet, so that the microcapsules are selectively changed in their mechanical strength to form a latent image on the microcapsule sheet corresponding to an image on the original sheet. The microcapsule sheet is superposed on a developer sheet which has been previously produced in the developer material coating device of the second embodiment. The superposed sheets are pressurized in the pressure-development unit, so that the microcapsules having lower mechanical strength are ruptured to issue therefrom the dye precursors. The dye precursors issued from the microcapsules are reacted with the developer material on the developer sheet to form a visible image on the developer sheet. The visible image on the developer sheet is thermally fixed in a fixing unit. As a result, the color image on the original sheet is transferred to the developer sheet.

In the image forming apparatus utilizing the developer material coating device of the second embodiment of the present invention, a developer sheet is produced in the developer material coating device in the image forming apparatus. Therefore, it becomes unnecessary to use a developer sheet sold on the market, but a user becomes able to select various types of sheets such as plain paper for the developer sheet.

The image forming apparatus will be described in more detail with reference to the drawing.

Figure 5:
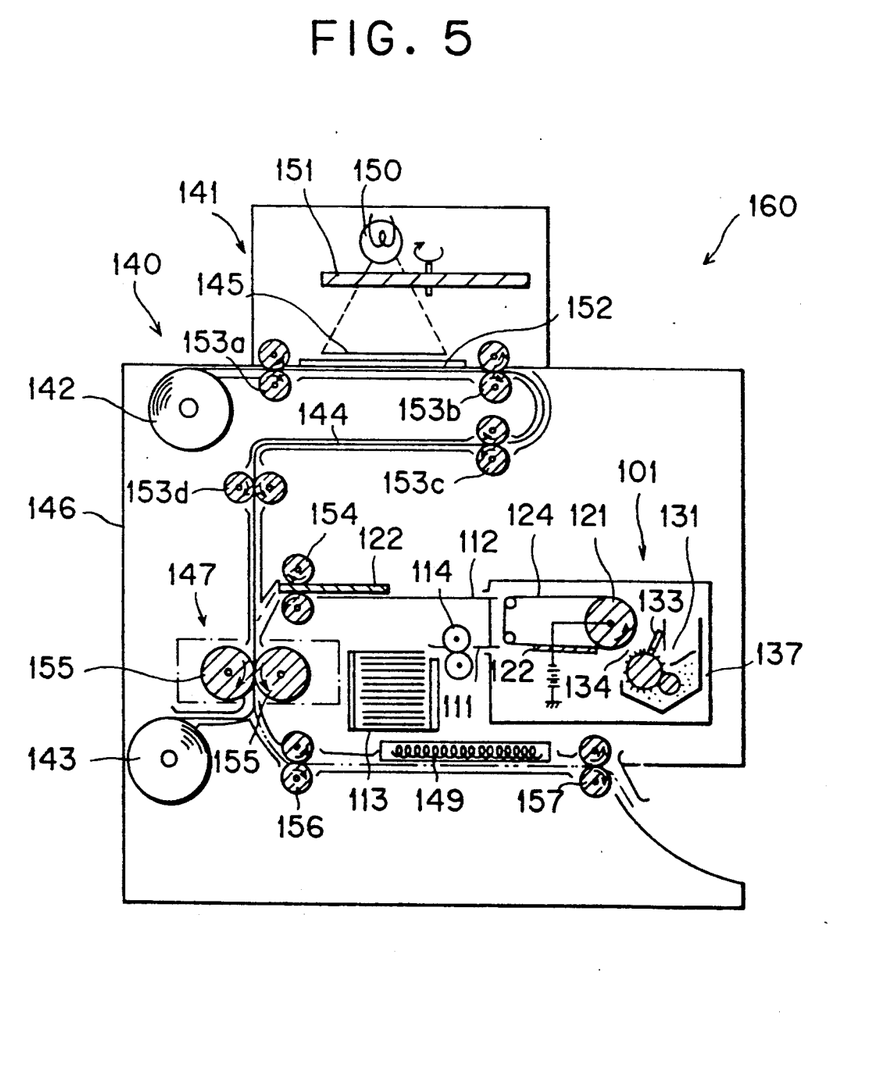
FIG. 5 shows a construction of a color image recording apparatus to which the imaging material coating device of the second embodiment is applied.

FIG. 5 shows a color image forming apparatus 160 to which the developer material coating device 101 of the second embodiment of the present invention is applied. The color image forming apparatus 160 comprises a color image recording device 140 and an exposure device 141. The exposure device 141 is disposed on the color image recording device 140. The exposure device 141 includes a halogen lamp 150 and a rotatable color separation filter unit 151 disposed below the halogen lamp 150. The filter unit 151 allows a light emitted from the halogen lamp 150 to pass therethrough and separates the light into three primary color components. Below the color separation unit 151, an original 152 is disposed on an original stand 145.

In the image recording device 140, a microcapsule sheet 144 is wound around a sheet supply roll 142. In a conveying path of the microcapsule sheet 144, there are provided pairs of guide rollers 153a, 153b, 153c and 153d for conveying the microcapsule sheet drawn out of the supply roll 142 to a pressure developing portion 155. There is further provided a take-up roller 143 for taking up the microcapsule sheet which has passed through the pressure developing portion 155.

A stack of plural support members 122 such as plain papers are accommodated in a cassette 113 disposed at a center of the image recording device 140. There are provided a pair of feed rollers 114 for conveying the support members 122 from the cassette 113 toward the developer material coating device 101. The feed rollers 114 are provided at a portion close to an upper opening of the cassette 113. The developer material coating device 101 constructed as described already with reference to FIG. 3 is disposed at the downstream side of the feed rollers 114 in a support member 122 conveying path and therefore is disposed near to the center position of the device 140. There are provided a pair of guide rollers 154 for conveying the support member 122 discharged from the device 101 toward the pressure developing device 147. A heat fixing device 149 is provided at the downstream side of the pressure developing device 147 in the support member conveying path. There are provided pairs of guide rollers 156 and 157, at both the inlet and outlet sides of the heat fixing device 149, respectively.

The color image forming apparatus 160 as constructed above operates as will be described below.

The microcapsule sheet 144 is drawn from the supply roll 142 to be fed through the pairs of guide rollers 153a, 153b, 153c and 153d and is taken up by the take-up roll 143. The microcapsule sheet travelling between the guide rollers 153a and 153b is placed in the exposure device 141 where the microcapsule sheet is exposed to light having passed through the color separation filter unit 151 and the original 152. The microcapsules receiving the light are changed in their mechanical strength, so that a latent image corresponding to the original image is formed on the microcapsule sheet 144. The microcapsule sheet is then conveyed by the pairs of guide rollers 153c and 153d toward the pressure developing device 147.

On the other hand, in the support member cassette 113, a topmost support member 122 is picked up from the stack of the support members to be fed out through the upper opening. The support member 122 is fed by the pair of feed rollers 114 into the developer material coating device 101 through the inlet 111. The entire surface of the support member is coated uniformly with the developer material particles in the developer material coating device 101, as described already, and is fed to the pressure developing device 147.

The microcapsule sheet 144 exposed to light in the exposure device 141 and the support member 122 coated uniformly with the developer material in the developer material coating device 101 are superposed one on the other by the guide rollers 153d and 154 to be fed into the pressure developing device 147. Thus superposed sheets 144 and 122 are fed into between a pair of pressurizing rollers 155. The rollers 155 pressurize the superposed sheets to subject the sheets to a pressure development action. That is, the microcapsules on the microcapsule sheet 144 which have been exposed to the light and thus have lower mechanical strength are ruptured under the pressure to issue the dye precursor therefrom. The dye precursor released from the microcapsules are reacted with the developer material on the support member 122, to thereby form a color visible image on the support member 122. The color image formed on the support member 122 is then thermally fixed in the heat fixing device 149.

The microcapsule sheet 144 having passed the pressure developing device 147 is taken up by the take-up roller 143. On the other hand, the support member 122 having passed the heat fixing device 149 is fed through the pair of guide rollers 157 to be discharged from the color image forming device 140.

In the above-described second embodiment, the developer material separating member 133 includes a single wire 133a. However, the developer material separating member 133 may include a plurality of wires 133a. Furthermore, the support member 122 is not limited to a plain paper, but may be a microcapsule sheet. In the case where a microcapsule sheet is used as the support member, a latent image is formed on the microcapsule sheet and then a visible image is also formed thereon.

As described above, according to the second embodiment of the present invention, the transferring region 134 is always supplied with a large amount of the developer material particles in the mist form, so that it becomes possible to uniformly coat the support member with a large amount of the developer material particles, even if the developer material coating device is operated for a long time.

Furthermore, according to the second embodiment, since the developer material coating device is provided in a color image forming apparatus, it becomes possible to produce a developer sheet in the image forming apparatus itself. Accordingly, it becomes unnecessary to use developer sheets sold on the market, but it becomes possible to select several kinds of papers such as plain papers for the developer sheets.

According to the imaging material providing device of the invention having such a simple structure as described above, it becomes possible to certainly provide a sufficient amount of imaging material particles to the region where the electric field occur. It becomes possible to prevent the imaging material particles from jamming in the carry means. Therefore, it becomes possible to continuously provide a sufficient amount of imaging material particles to the support member for a long time, with a simple structure without no additional unit such as an alternate high voltage power supply or air compressor. Therefore, it becomes possible to produce the device at low cost.

The present invention is not limited to the above-described embodiments, but several changes may be possible without departing from spirit and scope thereof. For example, the imaging material providing device of the present invention is applicable to an ordinary type electrophotographic machine such as a copying machine and a laser beam printer using toner particles. In this case, the imaging material receiving means is a photoreceptor such as a photosensitive drum. Therefore, an electrophotographic machine to which the present invention is applied comprises: means for carrying imaging material particles charged to a first polarity, the imaging material carrying means having a portion formed of elastic material for holding the imaging material particles; a photosensitive drum for receiving the imaging material particles, the photosensitive drum being disposed apart from the imaging material carrying means with a gap therebetween and being selectively charged to a second polarity opposite to the first polarity to form a latent image; means for elastically deforming the elastic portion of the carrying means, the imaging material particles being introduced into the gap when the deformed elastic portion is restored; and means for generating an electric field in the gap and electrostatically attracting the charged imaging material particles in a direction toward the photographic drum.

What is claimed is:

1. An imaging material providing device comprising:
   means for carrying imaging material particles charged to a first polarity, said imaging material carrying means comprises a brush-shaped roller member having a peripheral surface and an axis rotatable thereabout, a plurality of ciliary members being implanted on the peripheral surface thereof, each of the plurality of ciliary members being formed of elastic material for holding the imaging material particles;
   means for receiving the imaging material particles, the imaging material receiving means being disposed apart from said imaging material carrying means with a gap therebetween and being charged to a second polarity opposite to the first polarity so that the imaging material particles may be electrostatically attached onto said imaging material receiving means;
   means for elastically deforming the ciliary members of said carrying means, the imaging material particles being introduced into the gap when the deformed ciliary members are restored, said deforming means comprising a wire member extending in a direction in parallel to the axis and being disposed in contact with the ciliary members, the ciliary members being elastically deformed and then restored as the roller member rotates about the axis; and
   means for generating an electric field in the gap and electrostatically attracting the charged imaging material particles in a direction toward said imaging material receiving means.

2. An imaging material providing device as claimed in claim 1, wherein said imaging material receiving means comprises means for conveying a support member, and said electric field generating means comprises a plurality of control electrodes arranged in parallel to the axis of the roller member at a position between said support member conveying means and said imaging material carrying means, each of the control electrodes having an aperture, image signals being applied to the control electrodes to selectively charge the control electrodes to the second polarity, the charged imaging material particles passing through the apertures of the control electrodes to form a visible image on the support member corresponding to the image signals.

3. An imaging material providing device as claimed in claim 1, wherein said imaging material receiving means comprises means for conveying a support member, and said electric field generating means comprises means for charging said support member conveying means to the second polarity so that the entire surface of the support member may be coated with the imaging material particles.

4. An image forming apparatus for forming an image of an original document, comprising:

means for exposing a microcapsule sheet to an imaging light bearing the image of the original document to form a latent image thereon corresponding to the image of the original document, the microcapsule sheet having a surface coated with an immense number of pressure rupturable microcapsules, each microcapsule encapsulating therein dye precursor;

means for producing a developer sheet by providing imaging material particles to a support member;

means for developing the latent image by applying a pressure to the exposed microcapsule sheet and the developer sheet superposed one on the other to form a visible image on the developer sheet upon reaction of the dye precursor released from the ruptured microcapsules with the imaging material particles; and means for thermally fixing the visible image on the developer sheet;

wherein said developer sheet producing means comprises means for carrying imaging material particles charged to a first polarity, the imaging material carrying means having a portion formed of elastic material for holding the imaging material particles; means for conveying the support member, the conveying means being disposed apart from the imaging material carrying means with a gap therebetween and being charged to a second polarity opposite to the first polarity so that the imaging material particles may be electrostatically attached onto the support member; means for elastically deforming the elastic portion of the carrying means, the imaging material particles being introduced into the gap when the deformed elastic portion is restored; and means for generating an electric field in the gap and electrostatically attracting the charged imaging material particles in a direction toward the support member, said imaging material carrying means comprising a brush-shaped roller member having a peripheral surface and an axis rotatable thereabout, a plurality of ciliary members being implanted on the peripheral surface thereof, each of the plurality of ciliary members being formed of elastic material for holding the imaging material particles.

5. An image forming apparatus as claimed in claim 4 wherein the deforming means comprises a wire member extending in a direction in parallel to the axis and being disposed in contact with the ciliary members, the ciliary members being elastically deformed and then restored as the roller member rotates about the axis.

6. An image forming apparatus as claimed in claim 4, wherein the electric field generating means comprises means for charging the support member conveying means to the second polarity so that the entire surface of the support member may be coated with the imaging material particles.

7. An imaging material providing device comprising:

means for carrying imaging material particles charged to a first polarity, said imaging material carrying means having a portion formed of elastic material for holding the imaging material particles;

means for receiving the imaging material particles, the imaging material receiving means being disposed apart from said imaging material carrying means with a gap therebetween and being charged to a second polarity opposite to the first polarity so that the imaging material particles may be electrostatically attached onto said imaging material receiving means, said imaging material receiving means including means for conveying a support member;

means for elastically deforming the elastic portion of said carrying means, the imaging material particles being introduced into the gap when the deformed elastic portion is restored; and means for generating an electric field in the gap and electrostatically attracting the charged imaging material particles in a direction toward said imaging material receiving means, said electric field generating means including a plurality of control electrodes arranged at a position between said support member conveying means and said imaging material carrying means, each of the control electrodes having an aperture, image signals being applied to the control electrodes to selectively charge the control electrodes to the second polarity, the charged imaging material particles passing through the apertures of the control electrodes to form a visible image on the support member corresponding to the image signals.

8. An imaging material providing device as claimed in claim 7, wherein said imaging material carrying means comprises a brush-shaped roller member having a peripheral surface and an axis rotatable thereabout, the axis extending in such a manner that the plurality of control electrodes of said electric field generating means are arranged in parallel to the axis, a plurality of ciliary members being implanted on the peripheral surface thereof, each of the plurality of ciliary members being formed of elastic material for holding the imaging material particles.

9. An imaging material providing device as claimed in claim 8, wherein said deforming means comprises a blade member disposed in contact with the ciliary members, the ciliary members being elastically deformed and then restored as the roller member rotates about the axis.

* * * * *